United States Patent
Baumann et al.

(10) Patent No.: US 6,652,131 B2
(45) Date of Patent: Nov. 25, 2003

(54) MOTOR VEHICLE HAVING A LAMP UNIT

(75) Inventors: Karl-Heinz Baumann, Bondorf (DE); Ulrich Bruhnke, Ehningen (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/854,910

(22) Filed: May 15, 2001

(65) Prior Publication Data

US 2002/0008977 A1 Jan. 24, 2002

(30) Foreign Application Priority Data

May 15, 2000 (DE) .......................... 100 23 570

(51) Int. Cl.[7] .......................... F21V 21/34; F21V 15/04
(52) U.S. Cl. .................. 362/549; 362/369; 362/390; 362/496; 362/546
(58) Field of Search ............. 362/505, 496, 362/546, 549, 306, 369, 390

(56) References Cited

U.S. PATENT DOCUMENTS

| | | | | |
|---|---|---|---|---|
| 4,249,232 A | * | 2/1981 | Dick | 362/546 |
| 4,270,787 A | * | 6/1981 | Savell | 362/505 |
| 4,466,646 A | * | 8/1984 | Delmastro et al. | 362/505 |
| 6,190,030 B1 | * | 2/2001 | Chase | 362/549 |

FOREIGN PATENT DOCUMENTS

| | | |
|---|---|---|
| DE | 197 32 301 | 2/1998 |
| DE | 19955648 | 5/2000 |

* cited by examiner

*Primary Examiner*—Alan Cariaso
(74) *Attorney, Agent, or Firm*—Crowell & Moring LLP

(57) ABSTRACT

A motor vehicle having a lamp unit which is arranged on the outwardly facing end of a supporting structure of the vehicle, the arrangement of the lamp unit including an energy-absorbing deformation element which surrounds the circumference of an associated reflector and as a consequence of being supported axially on an opposite surface of the supporting structure collapses, with a reduction in length, when subjected to excessive impact stress, and the reflector forming a constructional unit together with a transparent lens and a lamp housing. The lamp housing itself is designed as an energy-absorbing deformation element.

9 Claims, 5 Drawing Sheets

MOTOR VEHICLE HAVING A LAMP UNIT

BACKGROUND AND SUMMARY OF THE INVENTION

This application claims the priority of German Patent Document 100 23 570.0, filed May 15, 2000, the disclosure of which is expressly incorporated by reference herein.

The invention relates to a motor vehicle having a lamp unit. A motor vehicle of this type, which can be taken as shown in German Reference DE 197 32 301 A1, has a lamp unit arranged on the front end of a supporting structure of the vehicle. In this case, a reflector forms a constructional unit together with a transparent lens and a lamp housing. The unit is held by a tubular, energy-absorbing deformation element surrounding the circumference of the constructional unit. For this purpose, the constructional unit can be inserted in the axial direction into the tubular deformation element and can be secured in the fitted position. The deformation element is supported axially on a wheel house wall and collapses, with a reduction in length, when subjected to excessive impact stress. However, the known arrangement is costly in terms of material and is relatively heavy.

An object of the present invention is to provide a motor vehicle having a lamp unit which can be constructed in a significantly simplified manner and can be produced at a lighter weight.

According to the invention, the lamp housing itself is designed as an energy-absorbing deformation element, with the saving on components making possible a simplified and cost-effective construction of the lamp unit. The arrangement with the lamp unit can be designed to be interchanged in a simple manner, so that when, subjected to light or medium impact stresses, only the housing of the lamp unit is deformed and can then be interchanged in a relatively cost-effective manner.

When the opposite surface of the supporting structure is arranged in a largely vertical vehicle transverse plane and runs approximately parallel to the rear end side of the lamp housing, a particularly effective support of the lamp housing on the supporting structure can be provided.

A lens, which is made of impact-resistant polycarbonate and is fixedly connected along its circumference to the outwardly facing end side of the lamp housing for the purpose of uniformly distributing occurring crash which occur has proven particularly advantageous.

The opposite surface is preferably designed as a region of an end wall which separates the region of minimal damage of the supporting structure from the crumple zone lying behind it in the event of more severe crashes. In this case, the components situated in front of the end wall, such as the lamp units, can be deformed in a crash without the structure lying behind it undergoing deformation beforehand.

The arrangement can be exchanged in a particularly simple manner by means of a lamp housing which can be inserted into guides and when inserted fitted position can be secured in its final position.

Other objects, advantages and novel features of the present invention will become apparent from the following detailed description of the invention when considered in conjunction with the accompanying drawings.

BRIEF DESCRIPTION OF THE DRAWINGS

Further advantages, features and details of the invention emerge from the following description of a preferred exemplary embodiment and with reference to the drawings; in the drawings FIGS. 1 and 2 each show a perspective view from above obliquely at the front of a supporting structure of a motor vehicle, which supporting structure is partially covered in FIG. 2 by panelling parts and includes a large-sized, front and rear end wall on which lamp units according to the invention can be arranged in each case.

DETAILED DESCRIPTION OF THE PREFERRED EMBODIMENTS

Figure 1:
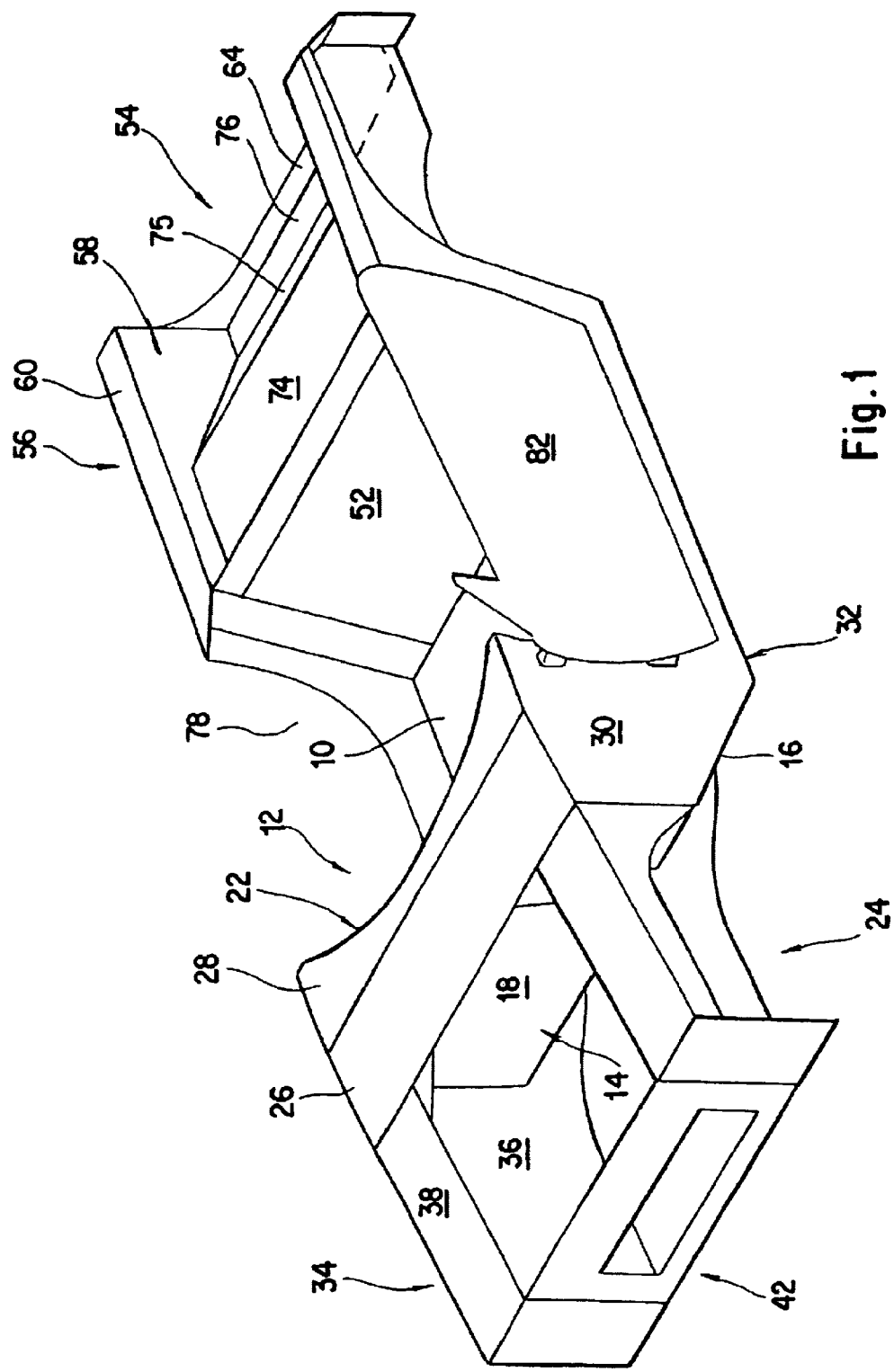

FIG. 1 illustrates, in a perspective view from above obliquely at the front, a predominantly energy-absorbing, inherently rigid motor-vehicle supporting structure which has planar lightweight constructional panels. The lightweight constructional panels are preferably manufactured as a sandwich construction, with a honeycomb structure, in wood, in aluminium, as a fibre composite, as an extruded profile or the like, depending on requirements. In order to obtain favourable manufacturing conditions, the individual panel sections may be of integral design and angled or else may be joined together in a number of pieces. At the front, in the leg room region 12, a supporting floor 10 merges into a front wall 14 of lightweight construction which includes a transition region 16, which is adjoined to the floor 10, and an approximately vertical region 18. The leg room region 12 is bounded at the sides and top by a panel arrangement which includes a front and a rear, upper lightweight constructional panel 26, 28 and lateral supporting-box walls 30 which, together with the floor 10 and the front wall 14, form a supporting box 22 for a front-end structure 24 to which it is fastened.

The front-end structure 24, which is designed as a crumple zone, includes two front frame side members 34 which each have an angled cross section with an approximately vertical panel limb 36 and a panel limb 38 running transversely thereto. Fastened to the front end of the frame side members 34 is a front end wall 42 which runs approximately vertically and in the transverse direction of the vehicle and consists of an extruded profile. The lightweight construction panel 42 may be of integral design or, as shown, joined together from a number of parts.

At the rear, the floor 10 merges into a rear partition 52, which protrudes obliquely upwards to the rear, and behind which is connected a rear structure 54, which is designed as a crumple zone, with rear frame side members 56. The latter, in each case, have a panel limb 58 angled in the vertical direction of the vehicle and a panel limb 60 angled in the longitudinal direction of the vehicle. A rear end wall 64, which runs in the transverse direction of the vehicle and is substantially vertical, is fastened to the rear end of the rear frame side members 56. The rear frame side members 56 are fixedly connected to one another via a panel arrangement comprising lightweight constructional panels 74, 75, 76 to form a box. A side wall 32 extending between the front and rear end walls 42, 64 has a door cutout 78 for a side door 80 (FIG. 2), of which only a left-hand door inner wall 82 is illustrated here.

Figure 2:
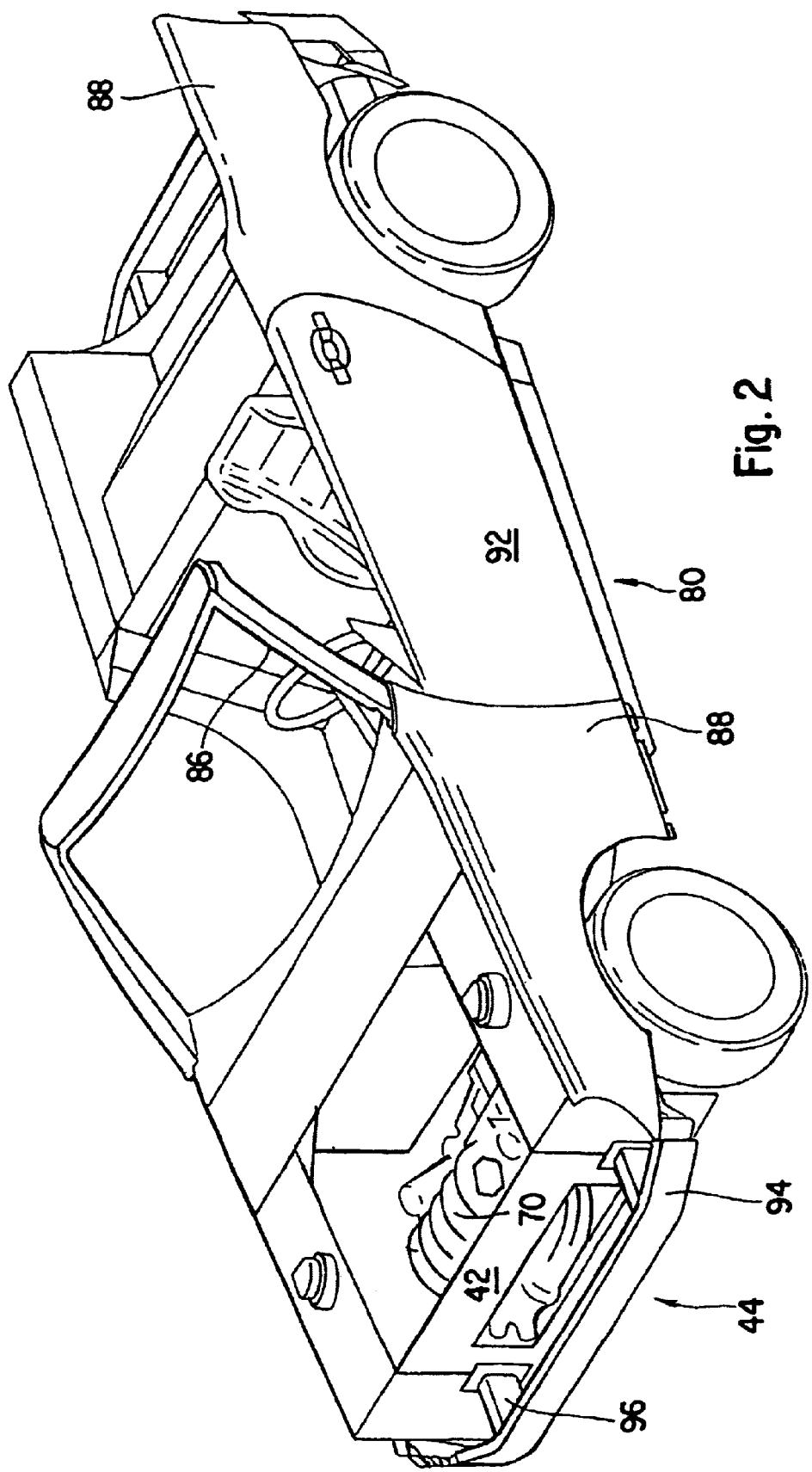

The supporting structure in accordance with FIG. 1, which is shown in perspective view in FIG. 2, is arranged under panelling, with panelling parts 88, which are secured on corresponding holders of the supporting structure, and which belong to the right-hand, front and rear mudguards shown here. In addition, a front module 50 can be seen on the front side of the front end wall 42, this module having a frame crossmember 94 which is secured on the lightweight constructional panel 42 via two longitudinal limbs 96.

Figure 3:
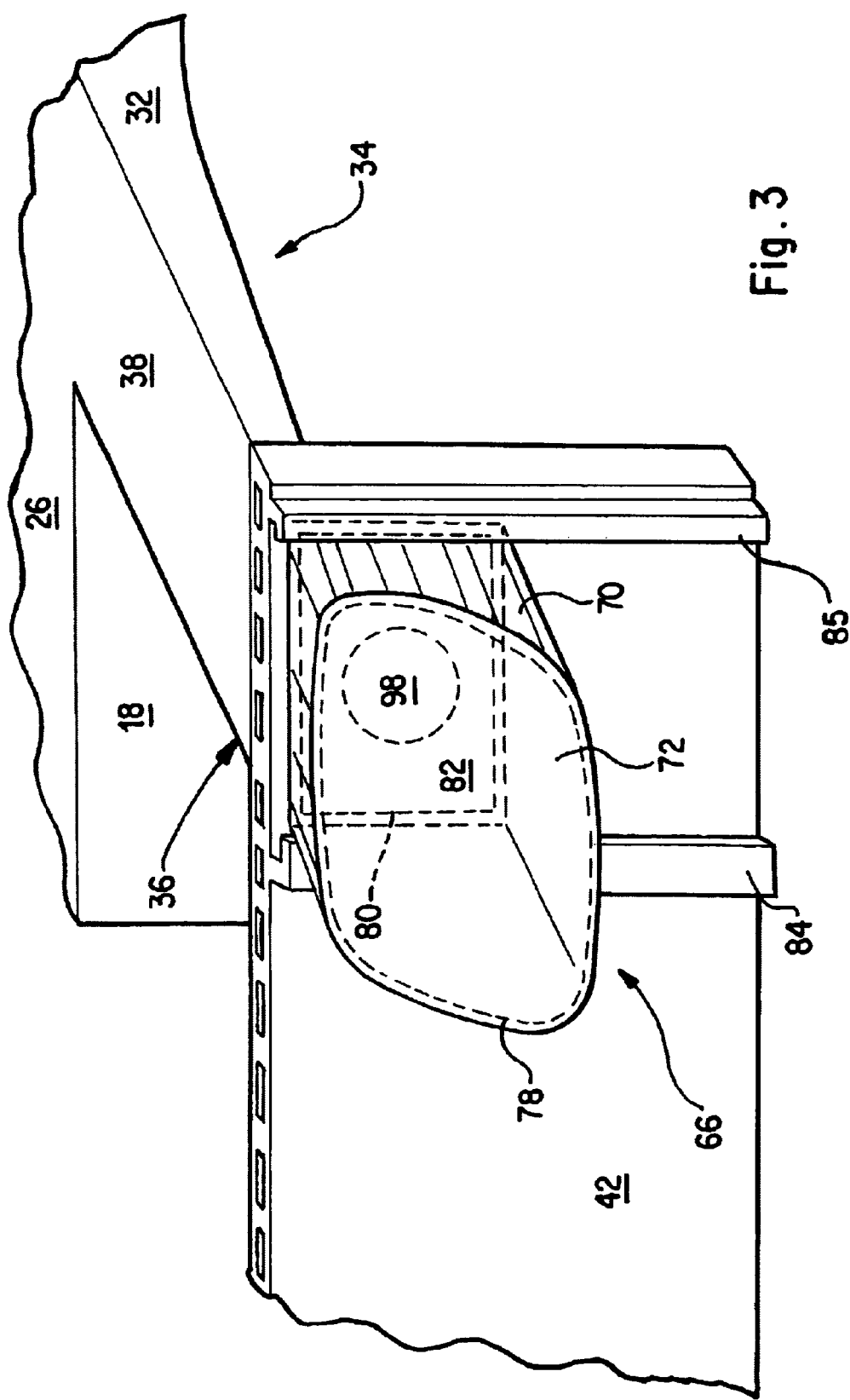
FIG. 3 shows part of a schematic perspective view of the front end wall of the supporting structure with a lamp unit according to the invention fastened to it.

FIG. 3 shows, in a schematic perspective view, part of the front end wall 42 which is fastened in the region of the front frame side member 34 and on whose front side a lamp unit 66 is arranged. The lamp unit 66 has a lamp housing 70 surrounding the circumference of an associated reflector 68, as is indicated schematically in FIGS. 4 and 5. The lamp housing 70 is designed as an energy-absorbing deformation element. For this purpose, the lamp housing 70 is preferably manufactured from an energy-absorbing plastic, such as carbon fiber reinforced plastic or fiber reinforced plastic, or from a metal alloy. The manner in which the lamp unit acts when subjected to excessive impact stress will be discussed below in more detail. The reflector 68 and the lamp housing 70 accommodating the reflector form a constructional unit together with a transparent lens 72. The lens 72 is produced here from polycarbonate and is connected along its circumference to the forwardly facing end side 78 (indicated by dashed lines) of the lamp housing 70 in a force-distributing manner. Accordingly, the lamp housing 70 is adapted by its front end side 78 to the circumference of the lens 72. The cross section of the lamp housing 70, which cross section is adapted in the front region to the lens 72, merges in the direction of the rear end side 80 (indicated by dashed lines) into an approximately rectangular cross section. By means of this approximately rectangular rear end side 80 the lamp housing 70 is supported axially, with a reduction in length, against an opposite surface 82 of the front end wall 42 when subjected to excessive impact stress. The opposite surface 82 extends as a planar region of the end wall 42 in a vertical transverse plane of the vehicle on which the rear end side 80 of the lamp housing 70 is already supported in the fitted position. However, it would also be conceivable for the rear end side 80 to end in the fitted position at a distance in front of the opposite surface 82 and to only be supported on the end wall 42 as a consequence of a crash-induced displacement in the direction thereof. In this connection, the rear end side 80 preferably extends approximately parallel to the opposite surface 82 so that the lamp housing 70 can be supported, in the event of its crash-induced displacement, by the rear end surface 80 on the opposite surface 82 in a force-distributing manner. In this connection, it would also be conceivable for the opposite surface 82 to be arranged in a surface which is inclined with respect to the end wall 42. In order to make possible a simple fastening of the lamp unit 66 to the front end wall 42, sliding guides 84, 85, which run more or less vertically and into which the lamp housing 70 is inserted by its rear region, are provided on the end wall. The two sliding guides 84, 85 are shown as L-shaped design in cross section and are designed integrally with the extruded profile of the end wall 42. In order to ensure a particularly good support of the lamp unit 66 on the supporting structure, the opposite surface 82 lies approximately in the overlapping region with the associated end of the frame side member 34.

Figure 4:
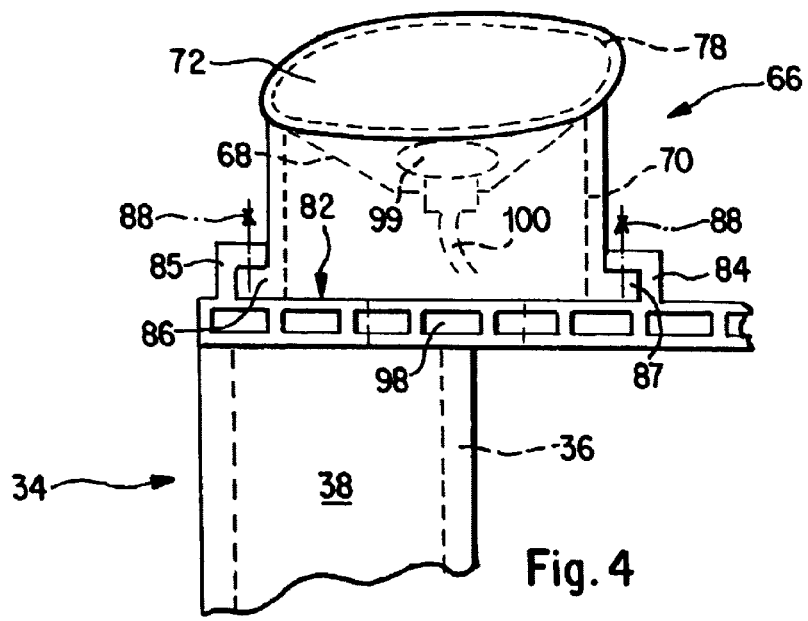
FIG. 4 shown a schematic plan view of the front end wall and the lamp unit which is fastened, to it in accordance with FIG. 3.

FIG. 4 shows, in a schematic, part plan view, the front end wall 42, which is supported by the front end of the left-hand frame side member 35, and the lamp unit 66 in accordance with FIG. 3 which is fastened to it, it being possible to see, in particular, the integral design of the sliding guides 84, 85 and of the end wall 42. The lamp housing 70 is provided on its approximately right-angled, rear region with guide strips 86, 87 which run vertically, extend over more or less the entire height of the lamp housing 70 and are used to enable the lamp housing 70 to be inserted into the sliding guides 84, 85. In the inserted fitted position the lamp unit 66 is fixed here to the end wall 42 via screw connections 88. Of course, other fixing means, such as tabs, strips or the like, would also be conceivable. The plane support of the lamp housing 70 on the opposite surface 82 has the advantage that the fixing means do not themselves take up any impact forces and therefore do not have to be orientated towards crash considerations. Equally, it would also be conceivable to arrange the sliding guides 84, 85 more or less horizontally and therefore to insert the lamp unit 66 horizontally. An oblique arrangement of the sliding guides 84, 85 would also be possible. Indicated by dashed lines next to the reflector 68, which is accommodated in the lamp housing 70, is a light source 99 which is accessible here from the rear via an installation and maintenance opening 98 (FIG. 3) in the end wall 42. The cables 100 of the light source 99 can be guided through this opening 98, in which case the lamp housing 70 is open at the rear. It would also be conceivable to use the sliding guides 84, 85 in combination with the strips 86, 87 as conductor rails for the power supply of the light source 98.

Figure 5:
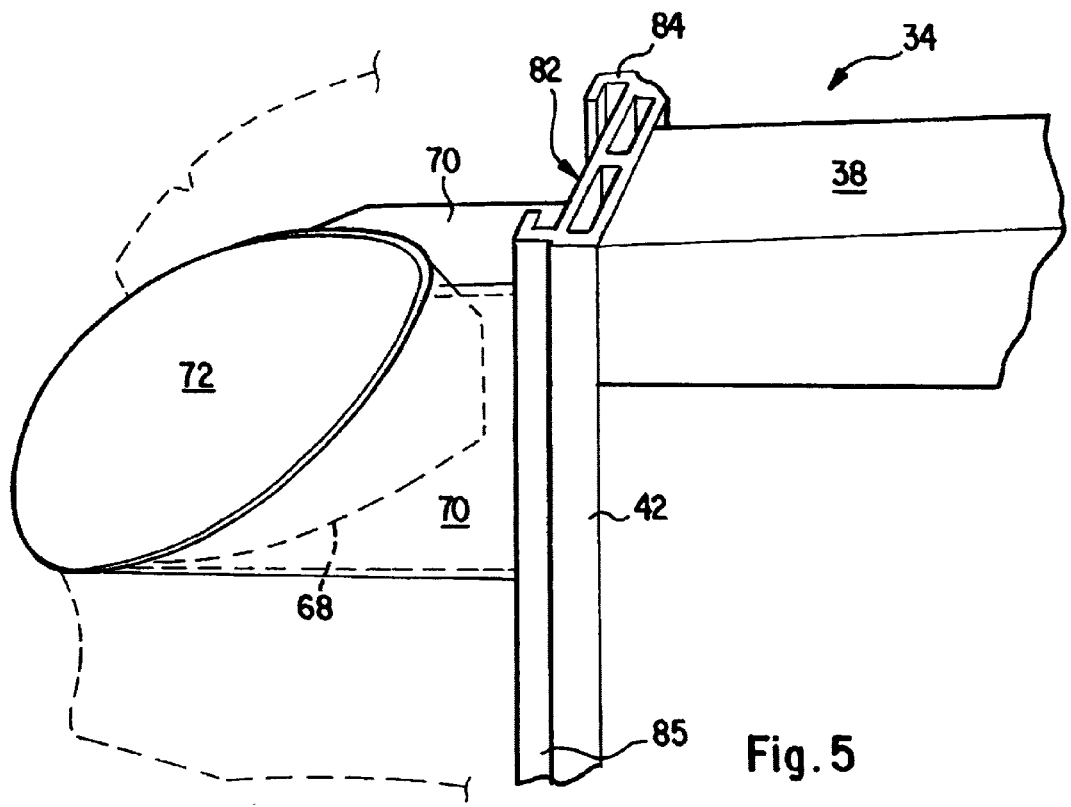
FIG. 5 shows schematic, perspective side view of the front end wall and the lamp unit of FIGS. 3 and 4 fastened to it.
Figure 6:
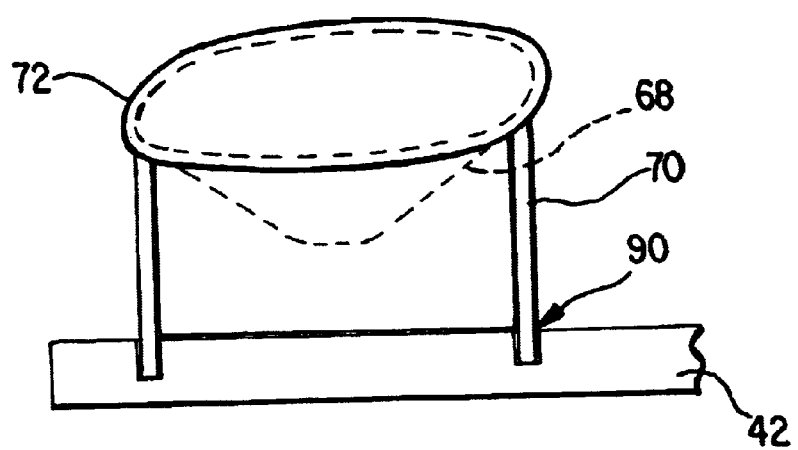
FIG. 6 shows an alternate connection of the lamp housing to the end wall of the supporting structure.

FIG. 5 shows part of a schematic, perspective side view of the front end wall 42 and the lamp unit 66 of FIGS. 3 and 4 which is fastened to it. It can be seen here that the lens 72 is adapted to the contour (indicated by dashed lines) of the forward end of the vehicle. In this case, the panelling parts 88 which line the supporting structure in the region of the lamp unit (FIG. 2) are to be designed in such a manner that the respective lamp housing 70 can be inserted into the sliding guides 84, 85. Of course it would also be conceivable to fasten the lamp housing 70 to the end wall 42 via a plug-in connection 90, for example, by plugging it on axially as shown in FIG. 6.

Of course, the lamp unit 66 can also be fastened to the rear end wall 64 as a rear lamp unit, or on supporting components of the supporting structure to the side of the supporting structure as a direction-indicator lamp unit. Instead of the supporting structure described here comprising planar lightweight constructional panels, it is, of course, also possible to use a supporting structure in a body monocoque or body/chassis construction that is customary nowadays. In addition to the lamp unit 66, other units, in particular the front module 50 or a similar rear module, can also be secured on the associated end wall 42, 64 via further sliding guides. In this arrangement, the other units 50 can likewise have a housing which is designed as a deformation part.

In the event of a head-on crash, the supporting structure preferably has a deformation sequence in which, first of all, the front module 50 together with the frame crossmember 94 and the longitudinal limbs 96 is deformed. In the event of a more severe impact the energy-absorbing lamp unit 66 and any other modules which are arranged in front of the end wall 42 are then acted upon before the front-end structure 24 together with the front frame side members 34 is used to further absorb the crash energy. Even in the case of severe crashes, the safety passenger cell retains its shape to a very great extent. In other words, the front end wall 42 separates the region of minimal damage of the supporting structure from the crumple region in the event of more severe crashes, i.e. the components lying in front of the end wall 42, such as the lamp units 66, can be deformed in the event of a head-on impact without the structure lying behind it undergoing deformation beforehand. In this manner, the lamp unit 66 acts as the effective energy absorber so as to protect the supporting structure, which lies behind it and can often be put into working order without great expense, at least in the region of small to medium crash severity. The lamp unit 66 is deformed by being squeezed between the obstacle and structure wall. In this case, the energy absorption capability of the entire lamp unit 66 can be influenced by the choice of material and dimensioning of the wall thickness of the lamp housing 70 or by ribbing of the housing wall.

The rear structure 54 is preferably also designed in accordance with the front-end structure 24.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A motor vehicle having a supporting structure for supporting the vehicle including a plurality of frame members, said motor vehicle also having a lamp unit arrangement on the outwardly facing end of the supporting structure of the vehicle, the lamp unit arrangement including a lamp housing designed as a single energy-absorbing deformation element which surrounds the circumference of an associated reflector and said lamp housing is supported on a first surface of the supporting structure whereby said deformation element collapses, with a reduction in length, when subjected to excessive impact stress, and wherein said reflector, a transparent lens and said lamp housing are together formed as a constructional unit, wherein said first surface of the supporting structure is arranged in a substantially vertical vehicle transverse plane and runs approximately parallel to a rear end side of the lamp housing, wherein the lamp housing is inserted, by its region facing the first surface of the supporting structure, into guides which are arranged on the first surface.

2. The motor vehicle according to claim 1, wherein the lamp housing has an approximately rectangular cross section at least in the region of the rear end side.

3. The motor vehicle according to claim 1, wherein the transparent lens comprises polycarbonate and is connected along its circumference to an outwardly facing end side of the lamp housing in a force-distributing manner.

4. The motor vehicle according to claim 1, wherein the first surface is a planar region of an end wall of the supporting structure.

5. The motor vehicle according to claim 4, wherein the end wall is a lightweight constructional wall consisting of an extruded profile.

6. The motor vehicle according to claim 1, wherein the guides are designed integrally with the end wall.

7. The motor vehicle according to claim 4, further including a plug-in connection provided for the attachment of the lamp housing to the end wall.

8. The motor vehicle according to claim 1, further including a frame side member wherein said first surface lies approximately in an overlapping region with an associated end of said frame side member.

9. The motor vehicle according to claim 1, wherein the supporting structure of the motor vehicle comprises a plurality of plane-parallel lightweight constructional panels, and frame side members comprising at least two lightweight constructional panels which bear at least one lightweight constructional panel on a respective end of said at least two lightweight constructional panels formed as an end wall.

* * * * *